(12) United States Patent
Saita et al.

(10) Patent No.: US 6,402,979 B1
(45) Date of Patent: Jun. 11, 2002

(54) MAGNETIC FERRITE MATERIAL AND MANUFACTURE METHOD THEREOF

(75) Inventors: Hitoshi Saita; Tomofumi Kuroda; Naoyoshi Sato, all of Tokyo (JP)

(73) Assignee: TDK Corporation, Tokyo (JP)

( * ) Notice: Subject to any disclaimer, the term of this patent is extended or adjusted under 35 U.S.C. 154(b) by 25 days.

(21) Appl. No.: 09/628,280

(22) Filed: Jul. 28, 2000

(30) Foreign Application Priority Data

Aug. 26, 1999 (JP) ............................................ 11-239468

(51) Int. Cl.$^7$ ............................ C04B 35/26; H01F 1/34
(52) U.S. Cl. ........................ 252/62.62; 252/62; 252/63
(58) Field of Search ............................. 252/62.62, 62.63

(56) References Cited

U.S. PATENT DOCUMENTS 6,077,453 A     6/2000   Saita et al. ............... 252/62.59

FOREIGN PATENT DOCUMENTS

| DE | 2612294 | * | 10/1977 |
| EP | 0 931 779 | | 7/1999 |
| JP | 1-179756 | * | 7/1989 |
| JP | 8-104563 | * | 4/1996 |
| JP | 8-169756 | | 7/1996 |
| JP | 11-144934 | | 5/1999 |

OTHER PUBLICATIONS

Takuya Aoki, et al., "Effect of Anion on the Formation of Ferrite", Journal of the Japan Society of Powder and Powder Metallurgy, vol. 45, No. 7, 1998, pp. 630–635 (with English edition).

* cited by examiner

*Primary Examiner*—C. Melissa Koslow
(74) *Attorney, Agent, or Firm*—Oblon, Spivak, McClelland, Maier & Neustadt, P.C.

(57) ABSTRACT

There is disclosed a magnetic ferrite material obtained by calcining a raw material, forming a calcined powder into a desired shape and sintering to contain $Fe_2O_3$, MnO and ZnO as main components, the magnetic ferrite material with a low power loss is realized by setting the coefficient of variation (CV value) of the content of a Ca component precipitated along a grain boundary in a range of 1 to 60%, and the magnetic ferrite material is manufactured by calcining the raw material containing $Fe_2O_3$, MnO and ZnO as the main components to obtain the calcined powder in which that the S component content is in a range of 1 to 200 ppm, and forming the calcined powder into the desired shape and sintering.

6 Claims, No Drawings

MAGNETIC FERRITE MATERIAL AND MANUFACTURE METHOD THEREOF

BACKGROUND OF THE INVENTION

The present invention relates to a magnetic ferrite material, particularly to an MnZn-based magnetic ferrite material for a transformer to be used in the magnetic core of a switching power supply, and the like and a manufacture method thereof.

An MnZn-based magnetic ferrite material has heretofore been used mainly as a transformer material for a communication apparatus and a power supply. Different from other magnetic ferrite materials, the MnZn-based magnetic ferrite material is characterized in that it has a high saturation magnetic flux density, permeability is also high, and power loss is small during the use as the transformer, and the addition of $SiO_2$, CaO can lower the power loss. Moreover, various additives are studied for a purpose of further reduction of the power loss.

However, the power loss is largely influenced by a slight amount of impurities contaminated during the manufacture process of the magnetic ferrite material, or a slight amount of impurities contained in a raw material. Therefore, the development of an MnZn-based magnetic ferrite material which stably realizes a low power loss has been desired.

SUMMARY OF THE INVENTION

The present invention has been developed in consideration of the above-described situation, an attention is given to that the non-uniform dispersion of a Ca component in the grain boundary of an MnZn-based magnetic ferrite material obstructs power loss reduction, and an object of the present invention is to provide an MnZn-based magnetic ferrite material which can realize a low power loss, and a method of manufacturing the magnetic ferrite material.

To achieve this and other objects, according to the present invention, there is provided a magnetic ferrite material which is obtained by calcining a raw material, forming a calcined powder into a desired shape and sintering and which contains $Fe_2O_3$, MnO and ZnO as main components, and in the constitution, the coefficient of variation (CV value) of the content of a Ca component precipitated along a grain boundary is in a range of 1 to 60%.

Moreover, in preferable embodiment, the magnetic ferrite material of the present invention is constituted so that the content of the Ca component is in a range of 200 to 1200 ppm. The Ca component is included in the calcined powder.

According to the present invention, there is provided a magnetic ferrite material manufacture method comprising the steps of: calcining a raw material containing $Fe_2O_3$, MnO and ZnO as main components to obtain a calcined powder in which the content of an S component is in a range of 1 to 200 ppm; and forming the calcined powder into a desired shape and sintering.

Moreover, in preferable embodiment, the magnetic ferrite material manufacture method of the present invention is constituted so that desulfurization is performed in the step of forming the calcined powder.

In the present invention, since the coefficient of variation (CV value) of the content of the Ca component precipitated along the grain boundary of the magnetic ferrite material is in the range of 1 to 60%, the Ca component as the additive is uniformly present along the grain boundary. Therefore, a high resistance layer uniformly surrounds grains, an eddy-current loss decreases, and the magnetic ferrite material with a low power loss can be obtained.

Moreover, by setting the content of the S component of the calcined powder to be in a predetermined range, the formation of $CaSO_4$ is depressed, and the Ca component as the additive easily forms a liquid phase with ferrite, so that the Ca component is prevented from being non-uniformly dispersed in the grain boundary of the magnetic ferrite material; and the magnetic ferrite material with the low power loss can be manufactured.

DETAILED DESCRIPTION OF THE PREFERRED EMBODIMENTS

An embodiment of the present invention will next be described.

Magnetic Ferrite Material

According to the present invention, there is provided a magnetic ferrite material which is obtained by calcining a raw material, forming a calcined powder into a desired shape and sintering and which contains $Fe_2O_3$, MnO and ZnO as main components. Moreover, the coefficient of variation (CV value) of the Ca content precipitated along the grain boundary of magnetic ferrite is in a range of 1 to 60%. In the present invention, since the CV value is in the range of 1 to 60%, the Ca component is prevented from being non-uniformly dispersed in the grain boundary of the magnetic ferrite material.

Here, the coefficient of variation (CV value) of the Ca content precipitated along the grain boundary will be described. In the present invention, composition is analyzed by a transmission electron microscope, and a value calculated by $s/x \times 100(\%)$ from a standard deviation s and average value x of the analyzed value is used as the coefficient of variation (CV value). In the above-described composition analysis, the diameter of a measurement area of one spot by an electron beam is set to 25 nm, the center of the electron beam spot is aligned with the center of the grain boundary, and the Ca content is measured in at least ten spots around one grain.

The coefficient of variation (CV value) of the Ca content with a larger numeric value means that the Ca component present along the grain boundary is non-uniform. In the present invention, by defining the CV value to be 60% or less, the Ca component is uniformly present along the grain boundary, a high resistance layer uniformly surrounds he grain, an eddy-current loss decreases, and the magnetic ferrite material with a low power loss (300 kW/m³ or less) can be realized.

The Ca content of the magnetic ferrite material of the present invention is preferably in a range of 200 to 1200 ppm. When the Ca content exceeds 1200 ppm, abnormal grain growth occurs and electromagnetic properties are deteriorated, and when the content is less than 200 ppm, a sufficient power loss reduction is not achieved. Additionally, the Ca component can be analyzed by dissolving the ground sample in aqua regia (nitric acid 1: hydrochloric acid 3) and using ICP emission spectroscopy.

Manufacture Method of Magnetic Ferrite Material

According to the present invention, there is provided a magnetic ferrite material manufacture method comprising: first calcining a raw material containing $Fe_2O_3$, MnO and ZnO as main components to obtain a calcined powder in which the content of an S component is in a range of 1 to 200 ppm. Subsequently, by forming the calcined powder into a desired shape and sintering, a magnetic ferrite material is obtained. In the present invention, by defining the content of the S component of the calcined powder, the segregation of the Ca component based on the formation of $CaSO_4$ is depressed, and the magnetic ferrite material with the low power loss can be manufactured.

When the content of the S component of the calcined powder exceeds 200 ppm, calcium sulfate ($CaSO_4$) is formed, the Ca component does not easily form a liquid phase with ferrite, and the non-uniform dispersion of the Ca component undesirably becomes remarkable. When the S content is less than 1 ppm, the material cost increase by the high purification of the raw material is undesirably caused.

In order to obtain the calcined powder so that the S content is in a range of 1 to 200 ppm, there are measures of: (1) using a raw material, a defoamer, a dispersant, and the like which contain a small amount of S, or no S component; and (2) reducing the amount of S element in the material by a desulfurizing process when the S component is contaminated in the material. The latter desulfurizing method is not particularly limited. When S in the material is easily decomposed in a low temperature, desulfurization can be performed by wet grinding, then drying a material slurry and further heating the obtained calcined powder to a temperature at which S is decomposed. Subsequently, by further grinding or cracking the calcined powder, adjusting the grain size of the calcined powder, and shaping and sintering, the ferrite material may be obtained. On the other hand, when S is not easily decomposed, such as $CaSO_4$, the desulfurization can be performed, for example, by drying the wet-ground material slurry on a heated plate of a metal (e.g., stainless steel, iron, titanium, and the like). Furthermore, when S is relatively easily dissolved in water, the desulfurization can be performed by filtering the wet-ground material slurry, removing the solution containing much S, and drying the slurry.

The S component in the calcined powder can be measured by grinding and then calcining/oxidizing the sample, and using an infrared detector to analyze converted $SO_2$.

Additionally, the calcined powder preferably contains an Si component in a range of 60 to 200 ppm, and a Ca component in a range of 200 to 1200 ppm for a purpose of power loss reduction. When the content of the Si component exceeds 200 ppm, in the sintering process the abnormal grain growth occurs and electromagnetic properties are deteriorated, and when the content is less than 60 ppm, a sufficient power loss reduction is not achieved. Moreover, when the content of the Ca component exceeds 1200 ppm, in the sintering process the abnormal grain growth occurs and the electromagnetic properties are deteriorated, and when the content is less than 200 ppm, the sufficient power loss reduction is not achieved.

To aim at the low power loss, as the additives other than $SiO_2$, $CaCO_3$, a slight amount of additives contributing to the low power loss, such as $Nb_2O_5$, $ZrO_2$, $V_2O_5$, $Ta_2O_5$, may be added. In this case, as the range of an additive amount, about 50 to 500 ppm is preferable for $Nb_2O_5$, $V_2O_5$, $Ta_2O_5$, and about 10 to 450 ppm is preferable for $ZrO_2$.

After forming the calcined powder into the desired shape in which the content of the S component is in a range of 1 to 200 ppm, the sintering can be performed, for example, at a temperature rise speed of about 100° C./hour in a range of 1200 to 1400° C. Moreover, in the subsequent cooling, the powder is cooled to a normal temperature at a cooling speed of 50 to 500° C./hour.

Concrete examples will next be described to describe the present invention in more detail.

EXAMPLE 1

As the main components $Fe_2O_3$, MnO and ZnO were weighed to obtain the following amounts, and mixed in a ball mill for 16 hours. Furthermore, the mixture powder was calcined at 850° C. for two hours. Additionally, the respective materials different from one another in the content of the S component as an impurity were used.

$Fe_2O_3$: 54 mol %
MnO: 38 mol %
ZnO: 8 mol %

Subsequently, $SiO_2$, $CaCO_3$, $Nb_2O_5$, $ZrO_2$ were added as the sub components to the calcined powder to obtain the following amounts with respect to the main components, and mixed to obtain the calcined powders (samples 1 to 9).

$SiO_2$: 100 ppm
$CaCO_3$: 800 ppm
$Nb_2O_5$: 300 ppm
$ZrO_2$: 250 ppm

With respect to the above-described calcined powders (samples 1 to 9), the sample was ground and then calcined/oxidized, and an infrared detector (EMIA-520 manufactured by Horiba, Ltd.) was used to measure the S content of converted $SO_2$. Results are shown in the following Table 1.

Subsequently, after adding polyvinyl alcohol as a binder to the respective obtained calcined powders by a solid content of 0.8 wt %, pressing was performed with a pressure of 1 ton/cm² to form a toroidal shape (outer diameter of 24 mm, inner diameter of 12 mm, thickness of 5.5 mm). Subsequently, the formed material was sintered under an $N_2$–$O_2$ mixture gas atmosphere with a controlled oxygen partial pressure at 1300° C. for five hours to obtain the magnetic ferrite materials (samples 1 to 9).

With respect to the obtained nine types of toroidal magnetic ferrite materials, the power loss was measured by an alternating-current B-H analyzer (IWATSU-8232 manufactured by Iwasaki Electric Co., Ltd.) at an exciting magnetic flux density of 200 mT, frequency of 100 kHz, and temperature of 100° C. The results are shown in the following Table 1

Moreover, the coefficient of variation (CV value) of the Ca content along the grain boundary of the magnetic ferrite material was measured by the following method, and the results are shown in the following Table 1.

Measurement Method of Coefficient of Variation (CV Value) of Ca Content

The method comprised: using a transmission electron microscope (JEM-2000FX-II manufactured by Nippon Electron Co., Ltd.); measuring the Ca content in ten peripheral spots around one grain; and calculating the coefficient of variation (CV value) by $s/x \times 100(\%)$ from a standard deviation s and average value x of the analyzed value. Additionally, the diameter of the measurement area of one spot of an electron beam was set to 25 nm, and the center of the electron beam spot was aligned with the center of the grain boundary to perform the measurement.

TABLE 1

| Sample No. | Content (ppm) of S component in calcined powder | CV value (%) of Ca content along grain boundary | Power loss (kW/m$^3$) of magnetic ferrite material |
| --- | --- | --- | --- |
| 1 | 72 | 42 | 260 |
| 2 | 87 | 34 | 258 |
| 3 | 134 | 49 | 275 |
| 4 | 150 | 55 | 270 |
| 5 | 200 | 56 | 295 |
| 6* | 232 | 65 | 363 |
| 7* | 270 | 73 | 320 |
| 8* | 282 | 78 | 371 |
| 9* | 354 | 86 | 367 |

The sample marked with an asterisk indicates a comparative example.

As shown in Table 1, in the magnetic ferrite materials (samples 1 to 5) in which the coefficient of variation (CV value) of the Ca content along the grain boundary is in a range of 1 to 60%, the power loss is 300 KW/m$^3$ or less. On the other hand, in the magnetic ferrite materials (samples 6 to 9) in which the coefficient of variation (CV value) of the Ca content along the grain boundary exceeds 60%, the power loss exceeds 300 kW/m$^3$.

It has also been confirmed that when an attention is given to the content of the S component in the calcined powder, the S content needs to be 200 ppm or less in order to set the power loss of the magnetic ferrite material to 300 kW/m$^3$ or less.

EXAMPLE 2

The calcined powders (samples 7' and 8') were obtained similarly to two types of calcined powders (samples 7 and 8) of Example 1 except that a desulfurizing treatment was performed on the following condition.

Desulfurizing Treatment Condition

Desulfurization was performed by drying the wet-ground calcined powder slurry on a plate of stainless steel heated to 500° C. for 0.5 hour.

With respect to the above-described calcined powders (samples 7' and 8'), the S content was measured similarly as Example 1, and results are shown in the following Table 2.

Subsequently, the respective obtained calcined powders (samples 7' and 8') were used, and the toroidal magnetic ferrite materials (samples 7' and 8') were obtained similarly as Example 1.

With respect to the obtained two types of toroidal magnetic ferrite materials, the power loss was measured similarly as Example 1, and results are shown in the following Table 2.

Moreover, the coefficient of variation (CV value) of the Ca content along the grain boundary of the magnetic ferrite material was measured in a similar method as Example 1, and results are shown in the following Table 2.

TABLE 2

| Sample No. | Content (ppm) of S component in calcined powder | CV value (%) of Ca content along grain boundary | Power loss (kW/m$^3$) of magnetic ferrite material |
| --- | --- | --- | --- |
| 7* | 270 | 73 | 320 |
| 7' | 80 | 40 | 290 |
| 8* | 282 | 78 | 371 |
| 8' | 110 | 43 | 275 |

The sample marked with the asterisk indicates the comparative example.

As shown in Table 2, the power loss of the magnetic ferrite material (samples 7' and 8') was 300 kW/m$^3$ or less. It has been confirmed from this that even when the S content of the calcined powder exceeds 200 ppm because of the impurities contaminated in the material, the magnetic ferrite material with the power loss of 300 kW/m$^3$ or less can be manufactured by setting the S content to 200 ppm or less by the desulfurization. Additionally, the coefficient of variation (CV value) of the Ca content along the grain boundary of the magnetic ferrite material (samples 7' and 8') is in a range of 1 to 60%.

EXAMPLE 3

As the main components $Fe_2O_3$, MnO and ZnO, with a small amount of the S component as the impurity, were weighed to obtain the following amounts, and mixed in the ball mill for 16 hours. Furthermore, the mixture powder was calcined at 850° C. for two hours.

$Fe_2O_3$: 54 mol%

MnO: 38 mol%

ZnO: 8 mol%

Subsequently, $SiO_2$, $CaCO_3$, $Nb_2O_5$, $ZrO_2$ were added as the sub components to the calcined powder to obtain the following amounts with respect to the main components, and mixed to obtain the calcined powders (samples 10 to 12). Additionally, in the wet grinding, a dispersant containing no S component was used in the samples 10, 11, and the dispersant containing much S component was used in the sample 12.

$SiO_2$: 100 ppm $CaCO_3$: 800 ppm $Nb_2O_5$: 300 ppm $ZrO_2$: 250 ppm

With respect to these calcined powders (samples 10 to 12), the S component amount was measured similarly as Example 1, and the results are shown in the following Table 3.

Subsequently, the respective obtained calcined powders (samples 10 to 12) were used, and the toroidal magnetic ferrite materials (samples 10 to 12) were obtained similarly as Example 1.

With respect to the obtained three types of toroidal magnetic ferrite materials, the power loss was measured similarly as Example 1. The results are shown in the following Table 3.

Moreover, the coefficient of variation (CV value) of the Ca content along the grain boundary of the magnetic ferrite material was measured by the method similar to that of Example 1, and the results are shown in the following Table 3.

TABLE 3

| Sample No. | Content (ppm) of S component in calcined powder | CV value (%) of Ca content along grain boundary | Power loss (kW/m³) of magnetic ferrite material |
|---|---|---|---|
| 10 | 82 | 45 | 286 |
| 11 | 72 | 42 | 277 |
| 12* | 230 | 65 | 320 |

The sample marked with the asterisk indicates the comparative example.

As shown in Table 3, when the calcined powder with the content of the S component exceeding 200 ppm by the impurity contained in the dispersant was used, the power loss of the magnetic ferrite material (sample 12) exceeded 300 kW/m³. It has been confirmed from this that the content of the S component in the calcined powder needs to be 200 ppm or less in order to set the power loss of the magnetic ferrite material to 300 kW/m³ or less.

On the other hand, for the magnetic ferrite material (samples 10, 11) manufactured using the calcined powder with the S content of 200 ppm or less, the coefficient of variation (CV value) of the Ca content along the grain boundary was in a range of 1 to 60%, and the power loss was 300 kW/m³ or less.

EXAMPLE 4

The calcined powders (samples 7" and 8") were obtained similarly as Example 2 except that the desulfurizing treatment was performed on the following condition instead of the desulfurizing treatment in Example 2.

Desulfurizing Treatment Condition

Desulfurization was performed by filtering the wet-ground calcined powder slurry, removing solution (containing much $CaSO_4$), and drying the obtained solid content.

With respect to the above-described calcined powders (samples 7" and 8"), the S content was measured similarly as Example 1, and the result was 200 ppm or less.

Subsequently, the respective calcined powders were used, the toroidal magnetic ferrite materials (samples 7" and 8") were obtained similarly as Example 1, and the power loss was measured similarly as Example 1. Moreover, the coefficient of variation (CV value) of the Ca content along the grain boundary of the magnetic ferrite material was measured in the method similar to that of Example 1. As a result, the power loss of each of these magnetic ferrite materials (samples 7" and 8") was 300 kW/m³ or less, and the coefficient of variation (CV value) of the Ca content along the grain boundary was in the range of 1 to 60%.

What is claimed is:

1. A magnetic ferrite material obtained by calcining a raw material containing $Fe_2O_3$, MnO and ZnO as the main components to obtain a calcined powder; and forming the calcined powder into a desired shape and sintering, wherein the magnetic ferrite material comprises Ca and includes grain boundaries; and a coefficient of variation (CV value) of the content of Ca precipitated in the grain boundaries is, along each of the grain boundaries, in a range of 1 to 60%.

2. The magnetic ferrite material according to claim 1, wherein the content of the Ca in the magnetic ferrite material is in a range of 200 to 1200 ppm.

3. The magnetic material according to claim 1, wherein the coefficient of variation (CV value) is in a range of 34 to 60%.

4. A method of manufacturing a magnetic ferrite material containing $Fe_2O_3$, MnO and ZnO as main components, the method comprising the steps of:

calcining a raw material containing $Fe_2O_3$, MnO and ZnO as the main components to obtain a calcined powder in which the content of S is in a range of 1 to 200 ppm; and forming the calcined powder into a desired shape and sintering.

5. The method according to claim 4, wherein desulfurization is performed in the step of forming the calcined powder.

6. A method of making a magnetic ferrite material, the method comprising sintering a powder containing $Fe_2O_3$, MnO and ZnO; and forming the magnetic ferrite material of claim 1.

* * * * *